(12) United States Patent
Bhatti

(10) Patent No.: US 8,770,063 B2
(45) Date of Patent: Jul. 8, 2014

(54) GEARBOX HOUSING ASSEMBLY

(75) Inventor: Irfan Bhatti, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 2204 days.

(21) Appl. No.: 11/742,098

(22) Filed: Apr. 30, 2007

(65) Prior Publication Data

US 2008/0264201 A1 Oct. 30, 2008

(51) Int. Cl.
*F16H 57/02* (2012.01)
*F16H 1/16* (2006.01)

(52) U.S. Cl.
USPC ......... 74/606 R; 74/425; 74/89.14; 74/89.16; 74/608; 74/424.71

(58) Field of Classification Search
USPC ......... 74/606 R, 607, 425, 89.14, 89.16, 724, 74/41, 608, 89.23, 89.17, 89.28, 89.34, 74/424.71; 297/362.11, 362, 330, 362.12, 297/362.14, 344.11; 248/422, 429, 419, 248/424, 231.85
See application file for complete search history.

(56) References Cited

U.S. PATENT DOCUMENTS

| | | | |
|---|---|---|---|
| 3,894,720 A | 7/1975 | Koji | |
| 4,216,624 A | 8/1980 | Blankenburg et al. | |
| 4,898,424 A | 2/1990 | Bell | |
| 4,962,963 A | 10/1990 | Robinson | |
| 5,056,213 A | 10/1991 | Behnke et al. | |
| 5,199,764 A | 4/1993 | Robinson | |
| 5,718,482 A | 2/1998 | Robinson | |
| 5,799,548 A | 9/1998 | Brooks et al. | |
| 5,816,116 A | 10/1998 | Antony et al. | |
| 5,823,622 A | 10/1998 | Fisher, IV et al. | |
| 6,322,146 B1 | 11/2001 | Fisher, Jr. | |
| 6,547,332 B2 | 4/2003 | Pejathaya | |
| 6,601,467 B1 | 8/2003 | Futterer | |
| 6,761,204 B1 | 7/2004 | Chou | |
| 7,051,986 B1 | 5/2006 | Taubmann et al. | |
| 7,143,513 B2 | 12/2006 | Taubmann et al. | |
| 7,437,962 B2 | 10/2008 | Taubmann et al. | |
| 2002/0073790 A1 | 6/2002 | Wiesler et al. | |
| 2002/0083786 A1 | 7/2002 | Yan et al. | |
| 2005/0126333 A1 | 6/2005 | Dohles et al. | |
| 2009/0000424 A1 | 1/2009 | Taubmann et al. | |

FOREIGN PATENT DOCUMENTS

| | | |
|---|---|---|
| DE | 19815283 A1 | 10/1999 |
| DE | 19931818 A1 | 1/2001 |
| DE | 10320290 B3 | 8/2004 |
| EP | 0759374 | 2/1997 |
| GB | 2034612 A | 6/1980 |
| GB | 2404704 A | 2/2005 |
| WO | 9745658 A1 | 12/1997 |

OTHER PUBLICATIONS

International Search Report and Written Opinion for corresponding International Application No. PCT/US2008/061363 mailed on Jul. 28, 2008.

*Primary Examiner* — Daniel Yabut
(74) *Attorney, Agent, or Firm* — Michael Best & Friedrich LLP

(57) ABSTRACT

A gearbox housing assembly includes a first plate constructed of a rigid material and defining a first plane. A second plate of the gearbox housing assembly defines a second plane parallel to and spaced from the first plane. The second plate is constructed of a rigid material. A plurality of connectors couples the first plate and the second plate, with an interior space being defined between the first plate and the second plate. A mounting member is coupled to the second plate and has a mounting portion extending away from the interior space. The mounting member is distinct from the second plate to facilitate interchangeability of the mounting member.

16 Claims, 5 Drawing Sheets

GEARBOX HOUSING ASSEMBLY

BACKGROUND

The present invention relates to a modular gearbox assembly, and more particularly to a gearbox housing assembly of the modular gearbox assembly.

In applications which require high strength for static or dynamic loading, a gearbox housing is typically constructed of a main housing portion that is commonly die cast metal (aluminum and steel being two common materials). The housing provides the structural strength to withstand tensile and compressive loads, for example, while also shrouding the gears located within the main housing portion. The potential environments for high-strength gearbox housings vary greatly, but generally, the secondary purpose of the housing is to keep unwanted substances out of contact with the gears.

FIG. 6 illustrates a portion of a prior art gearbox housing designed for a high strength application. The main housing portion 20 can be die cast as a single, solid part including a central cavity 24 for positioning the gears. A supplementary housing portion (not shown) is used to cover the open side of the main housing portion 20 once the gears (not shown) are positioned inside the cavity 24. The main housing portion 20 is formed to include attachment structure 28 for joining with an input drive source (not shown) such as an electric motor or other prime mover. Additionally, the main housing portion 20 is formed to include primary mounting structure 32 for fixing the gearbox housing to a supplementary structure, such as a stationary mounting rod. The main housing portion 20 is formed to include a plurality of strengthening ribs 36, some of which are shown in FIG. 6.

Because the main housing portion 20 is relatively complex, including a gear cavity, attachment structure, primary mounting structure, and at least some additional strengthening features, the component is relatively complex and expensive to produce, requiring dedicated tooling and maintenance. Any variations to any feature of the main housing portion 20, such as a differently-shaped or differently-sized primary mounting structure 32 requires completely separate tooling. For a manufacturer that makes many types of gearbox housings for different customers or applications that each has at least one unique feature, the costs for separate tooling and maintenance can become quite extensive.

In addition to the inherent complexity and expense in manufacturing, the resulting gearbox housing is unduly heavy because of its all-metallic construction. Specifically, in many applications, the gearbox housing is designed for high-strength along a single axis, and the gearbox housing includes a substantial amount of excess material, which provides an abundance of strength in certain areas that do not require such strength.

SUMMARY

In one embodiment, the invention provides a gearbox housing assembly including a first plate constructed of a rigid material and defining a first plane. A second plate of the gearbox housing assembly defines a second plane parallel to and spaced from the first plane. The second plate is constructed of a rigid material. A plurality of connectors couple the first plate and the second plate, an interior space being defined between the first plate and the second plate. A mounting member is coupled to the second plate and has a mounting portion extending away from the interior space. The mounting member is distinct from the second plate to facilitate interchangeability of the mounting member.

In yet another embodiment, the invention provides a modular gearbox assembly including a first plate defining a first plane and a second plate defining a second plane parallel to and spaced from the first plane. The first plate and the second plate are rigidly coupled together, thereby defining an assembled frame structure. The modular gearbox assembly further includes a cross-axis gear set positioned at least partially in an interior space defined between the first plate and the second plate. The modular gearbox assembly further includes a mounting member coupled to one of the first plate and the second plate, the mounting member having at least one mounting flange extending away from the interior space. The modular gearbox assembly further includes at least one cover member that is removable from the assembled frame structure without disassembling of the frame structure.

In yet another embodiment, the invention provides a method of constructing gearbox housing assemblies including each of the following steps. A first set of plates are selected. A first set of connectors are selected. The first set of plates are coupled together in a parallel spaced-apart relationship with the first set of connectors, thereby providing a first frame for a first gearbox housing assembly having a first structural rigidity. A second set of plates are selected. A second set of connectors are selected. The second set of plates are coupled together in a parallel spaced-apart relationship with the second set of connectors, thereby providing a second frame for a second gearbox housing assembly having a second structural rigidity that is greater than the first structural rigidity. An interior space between the first set of plates is substantially enclosed with at least a first cover member, and an interior space between the second set of plates is substantially enclosed with at least a second cover member substantially identical to the first cover member.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

FIGS. 1-4B illustrate a modular gearbox assembly 100 having a gearbox housing assembly 104 and a gear set 108 positioned within the gearbox housing assembly 104. The gear set 108 includes a first gear 108A rotatable about a first axis A and a second gear 108B rotatable about a second axis B and in meshed relationship with the first gear 108A for transmitting torque therebetween. In the illustrated embodiment, the gear set 108 is a cross-axis gear set and the first gear 108A is at a substantially right angle with the second gear 108B. In some embodiments, the first gear 108A is a worm and the second gear 108B is a worm gear. In other embodiments, the gear set 108 can include other types of gears, such as bevel gears for example.

In the illustrated embodiment, the gearbox assembly 100 is coupled to an input drive source (e.g., prime mover), such as an electric motor 112, which is coupled to the first gear 108A. Thus, the first gear 108A is an input gear to the gearbox assembly 100. The second gear 108B is an output gear, receiving torque from the first gear 108A. The input/output relationship between the first gear 108A and the second gear 108B is only exemplary. In some embodiments, the input/output relationship is reversed and/or the orientation of the gear set 108 within the gearbox housing assembly 104 is different than shown.

Figure 1:
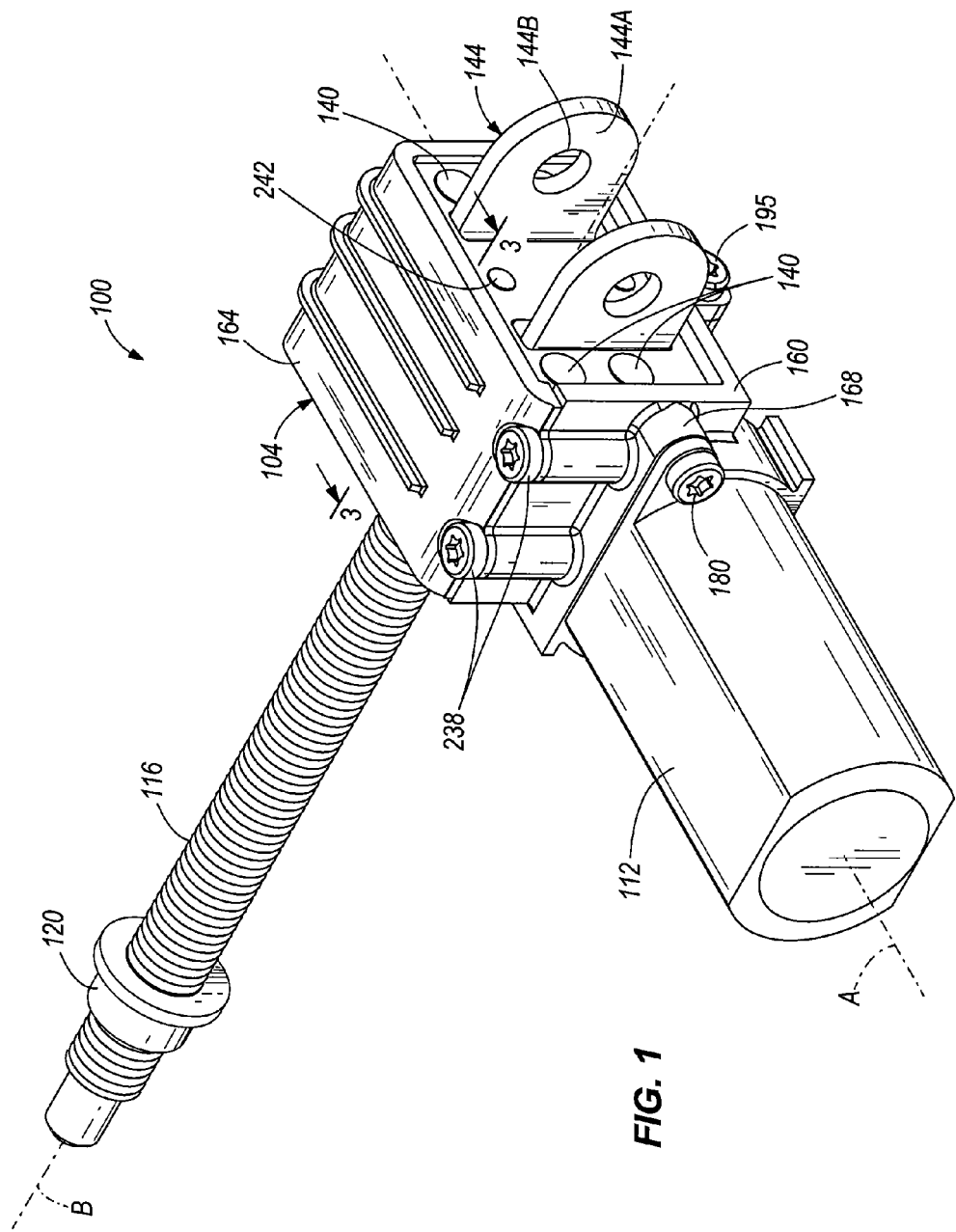
FIG. 1 is a perspective view of a modular gearbox assembly of the present invention.
Figure 2:
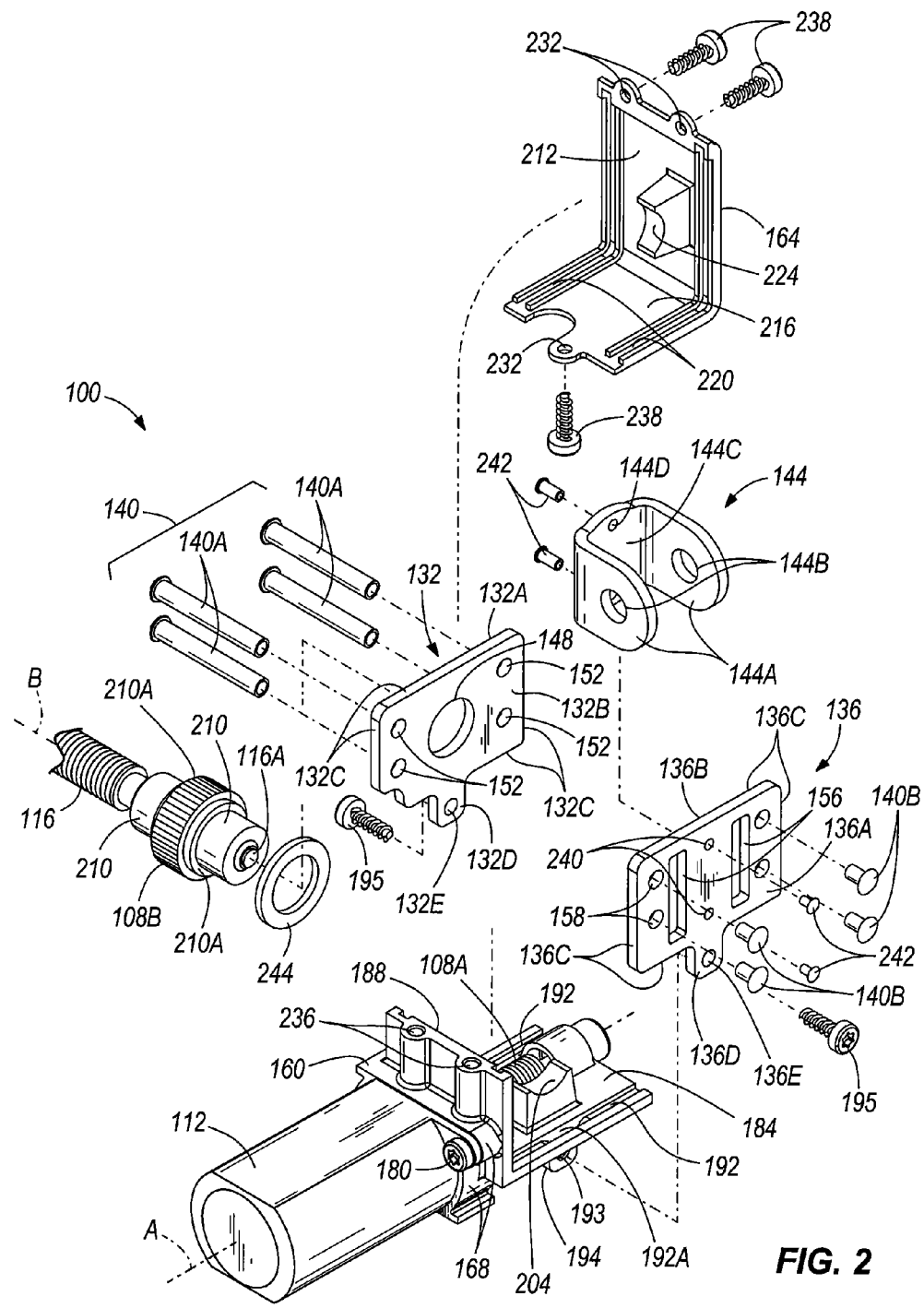
FIG. 2 is an exploded assembly view of the modular gearbox assembly of FIG. 1.
Figure 3:
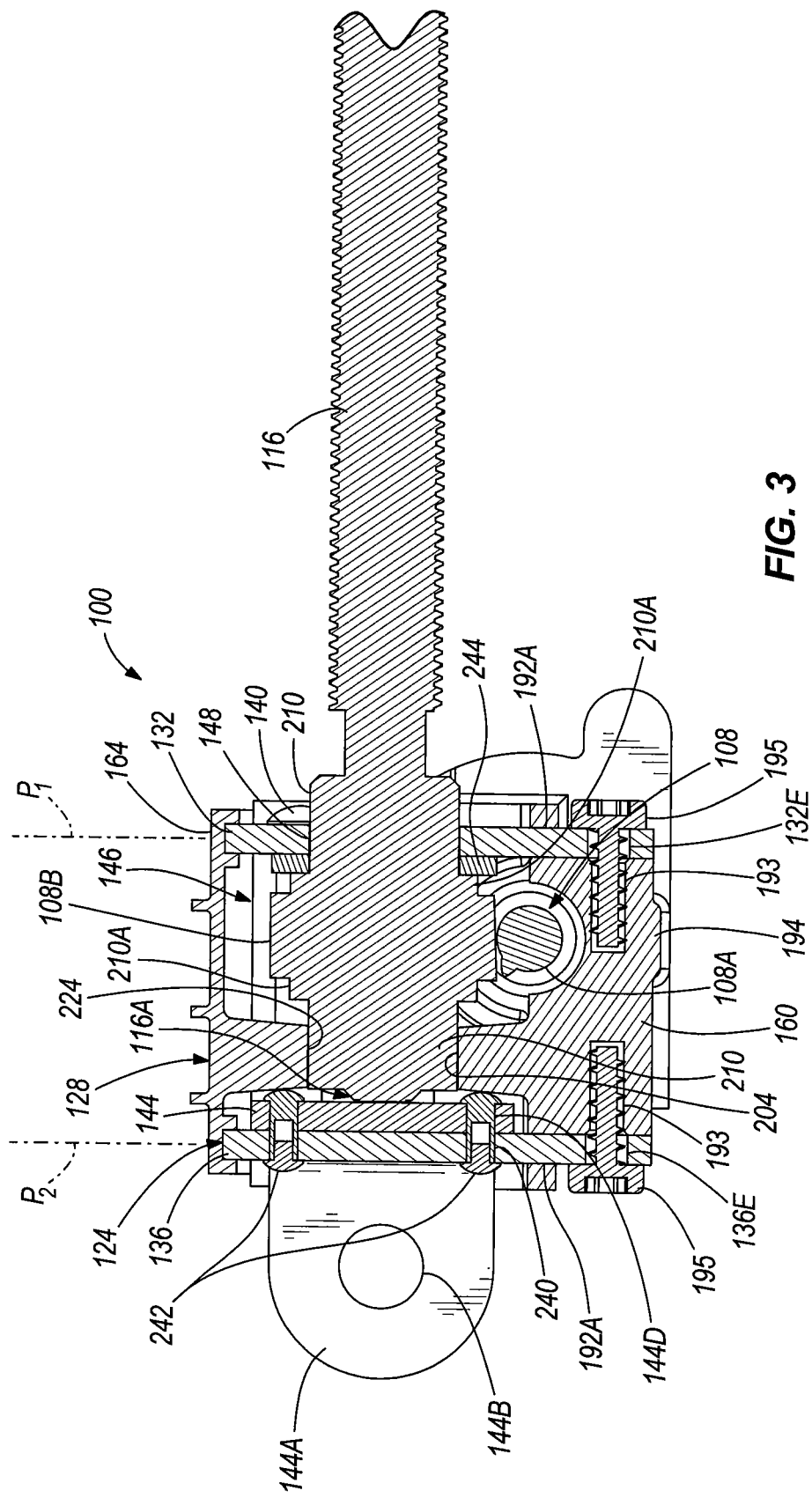
FIG. 3 is a cross-sectional view of the modular gearbox assembly of FIG. 1.

As shown in FIGS. 1-3, the second gear 108B is coupled to an output member, such as a lead screw 116. In the illustrated embodiment, the lead screw 116 is directly coupled to the second gear 108B to rotate therewith. The lead screw 116 extends along the axis B, which is shared by the second gear 108B. A drive nut 120 is positioned on an outer circumference of the lead screw 116, and engaged with the lead screw 116 through inter-engaging threads such that rotation of the lead screw 116 about its axis B effects a linear movement of the drive nut 120 related to the pitch of the lead screw 116. In other embodiments, the second gear 108B is coupled to an output member of another type and/or an alternate type driven member may be engaged by means other than directly-engaging threads (a ball screw, for example) with the output member.

The gearbox assembly 100 can be suited for a multitude of different applications such as a vehicle seat adjustment mechanism, and the particular details of the illustrated embodiment relating to the input into the gearbox assembly 100 and the output from the gearbox assembly 100 should not be considered limiting to the invention as described in more detail below. Furthermore, the invention is not limited to the particular shape and type of the gearbox assembly 100 as illustrated.

The gearbox assembly 100 includes a frame structure 124 and a cover assembly 128 formed separately from the frame structure 124. The frame structure 124 includes a first plate 132, a second plate 136, a plurality of connectors 140, and a mounting member 144. The mounting member 144 includes a pair of mounting portions 144A, each having a mounting aperture 144B therethrough. In the illustrated embodiment, the mounting member 144 is a U-shaped bracket, and the mounting portions 144A are flanges that protrude outwardly substantially perpendicular to a body portion 144C of the mounting member 144. In other embodiments, some of which are discussed in further detail below, the frame structure 124 can include more, fewer, or modified components compared to the illustrated embodiment of FIGS. 1-3. For example, the mounting member 144 can have a T-shape, L-shape, J-shape, among others, with at least one mounting portion 144A that has a straight, curved, or complex shape.

The first plate 132 is generally planar and thus, defines a first plane $P_1$. The first plate 132 is generally rectangular and has a first face 132A (facing outwardly), a second face 132B (facing inwardly), and peripheral side edges 132C. The second plate 136 is substantially similar to the first plate 132 and defines a second plane $P_2$. The second plate 136 has a first face 136A (facing outwardly), a second face 136B (facing inwardly), and peripheral side edges 136C. An interior space 146 is defined between the first plate 132 and the second plate 136 within which the gear set 108 is positioned. In some embodiments, the first plate 132 and the second plate 136 have shapes other than rectangular (polygonal, round, elliptical, irregular etc.) and/or one or more side edges are defined that correspond to the given shape of the plates 132 and 136.

The first plate 132 includes an aperture 148 generally centrally-located and extending through the first face 132A and the second face 132B. The first plate 132 additionally includes generally peripherally-located apertures 152 which receive the connectors 140 as discussed in further detail below. The first and second plates 132 and 136 further include respective protruded portions 132D and 136D with respective apertures 132E and 136E. The protruded portions 132D and 136D are engageable with the cover assembly 128 as discussed in further detail below.

The second plate 136 includes a pair of spaced-apart slots 156. The slots 156 are sized and positioned to receive the mounting portions 144A of the mounting member 144. In some embodiments, the mounting member 144 includes more or less than two mounting portions 144A, and the second plate 136 includes one or more slots 156 or other apertures sized and positioned to receive the mounting portions 144A. The second plate 136 additionally includes generally peripherally-located apertures 158, which can be aligned with the apertures 152 of the first plate 132 and which receive the connectors 140 as discussed in further detail below.

The cover assembly 128 introduced generally above, includes a first cover member 160 and a second cover member 164. The first cover member 160 is formed to include attachment structure 168 for receiving an input drive source, in the illustrated embodiment, the electric motor 112. The attachment structure 168 includes a central aperture 172 and peripheral apertures 176. The central aperture 172 receives a drive shaft of the input drive source and/or the first gear 108A. In the illustrated embodiment, the first gear 108A passes through the central aperture 172 and is directly coupled to the electric motor 112. The peripheral apertures 176 may engage fasteners 180 to secure the electric motor 112 to the gearbox assembly 100.

Figure 4A:
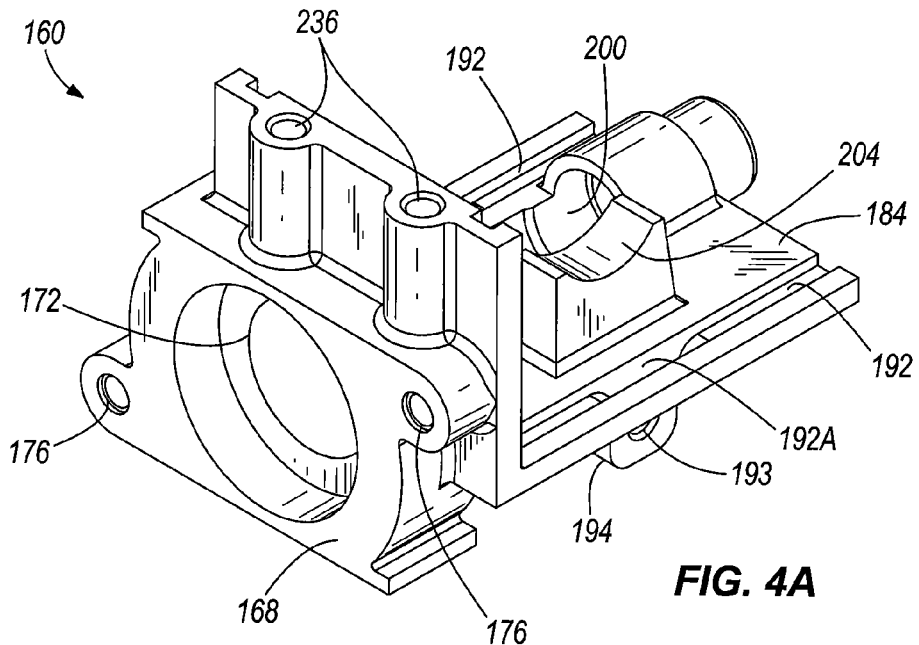
FIG. 4A is a first perspective view of a cover member of the modular gearbox assembly of FIG. 1.
Figure 4B:
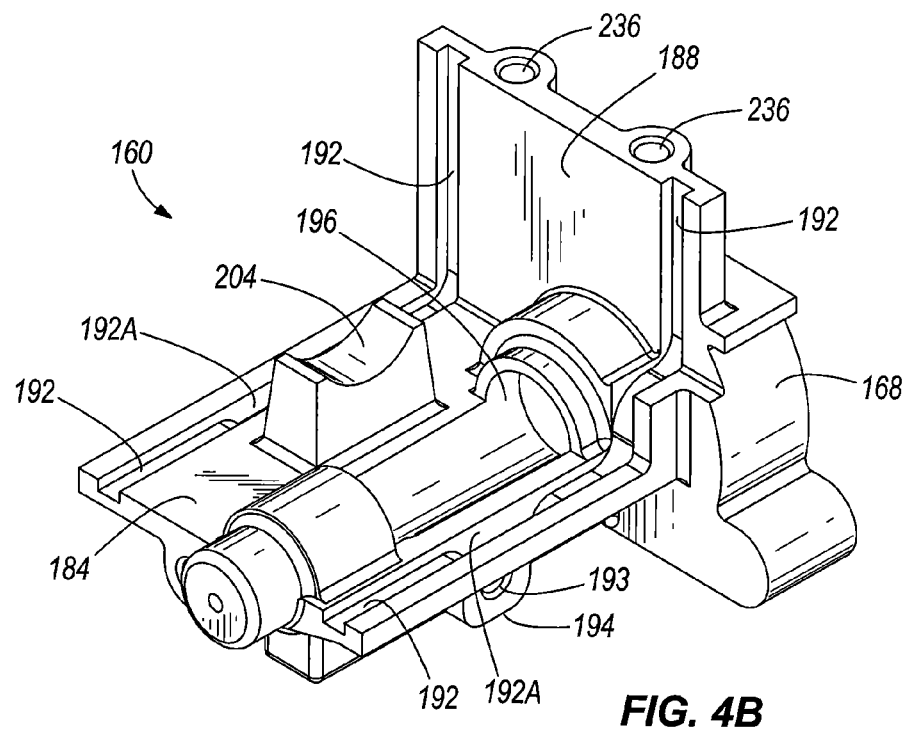
FIG. 4B is a second perspective view of the cover member shown in FIG. 4A.

In the illustrated embodiment, the first cover member 160 is generally L-shaped and defines a first interior surface 184 and a second interior surface 188 as best illustrated in FIGS. 4A and 4B. Grooves 192 are formed on both the first interior surface 184 and the second interior surface 188. The grooves 192 are sized and positioned to receive portions of the first and second plates 132 and 136. In the illustrated embodiment, the grooves 192 in the first cover member 160 receive two of the peripheral side edges 132C of the first plate 132 and two of the peripheral side edges 136C of the second plate. The first interior surface 184 of the first cover member 160 includes two slots 192A. Each of the two slots 192A are positioned in one of the grooves 192 to receive the protruded portions 132D and 136D of the first and second plates 132 and 136 as shown in FIG. 3. When inserted through the slots 192A, the apertures 132E and 136E in the protruded portions 132D and 136D can be aligned with apertures 193 formed in bosses 194 of the first cover member 160. Fasteners 195 can engage the apertures 132E and 136E of the first and second plates 132 and 136 as well as the apertures 193 of the first cover member 160 to couple the first and second plates 132 and 136 to the first cover member 160. In some embodiments, the apertures 193 are threaded, and the fasteners 195 are threaded to engage the apertures 193 as shown in FIG. 3. In other embodiments, the apertures 193 are not threaded, and the fasteners 195 may be self-tapping or may include other fastening structure besides threads.

As shown in FIGS. 4A and 4B, the first cover member 160 includes a first bearing surface 196 (see FIG. 4B) and a second bearing surface 200 (see FIG. 4A) extending from the first interior surface 184. The first and second bearing surfaces 196 and 200 can be integrally-formed as part of the first cover member 160 and positioned to directly contact end portions of the first gear 108A. In other embodiments, the end portions of the first gear 108A are received by bearing assemblies fitted to the first cover member 160 at the first and second bearing surfaces 196 and 200. The first cover member 160 also includes a third bearing surface 204. The third bearing surface 204 can be integrally-formed as part of the first cover member 160 and positioned to directly contact one of the bearing portions 210 flanking the second gear 108B as described in further detail below. In other embodiments, a separate bearing assembly is provided between the first cover member 160 and the bearing portion 210.

As best shown in FIG. 2, the second cover member 164 is generally L-shaped in the illustrated embodiment and defines a first interior surface 212 and a second interior surface 216. Grooves 220 are formed on both the first interior surface 212 and the second interior surface 216. The grooves 220 are sized and positioned to receive portions of the first and second plates 132 and 136. In the illustrated embodiment, the grooves 220 in the second cover member 164 receive two of the peripheral side edges 132C of the first plate 132 and two of the peripheral side edges 136C of the second plate.

As shown in FIGS. 2 and 3, the second cover member 164 includes a bearing surface 224 extending from the first interior surface 212. The bearing surface 224 can be integrally-formed as part of the second cover member 164 and positioned to directly contact one of the bearing portions 210 of the second gear 108B. In other embodiments, a separate bearing assembly may be provided between the second cover member 164 and the bearing portion 210. In the illustrated embodiment, the bearing surface 224 of the second cover member 164 combines with the third bearing surface 204 of the first cover member 160 to substantially enclose and sandwich one of the bearing portions 210 of the second gear 108B. In the illustrated embodiment, a shoulder 210A of the bearing portion 210 abuts the bearing surface 224 of the second cover member 164 and the third bearing surface 204 of the first cover member 160. The shoulder 210A helps to axially position the second gear 108B. The coefficient of friction between the bearing portion 210 and the bearing surfaces 204 and 224 is substantially low such that the second gear 108B is clamped into position while being allowed to freely rotate about its axis B.

In some embodiments, the bearing portions 210 can be formed of a primary material as part of the lead screw 116 and/or part of the second gear 108B as shown in FIG. 3. Optionally, the bearing portions 210 are overmolded with a low friction secondary material over the primary material. For example, the primary material may be metallic, such as steel or aluminum and the secondary material may be a polymer, such as nylon or acetal. Alternately, the bearing portions 210 may be formed separately from the lead screw 116 and separately from the second gear 108B and removably or permanently coupled to at least one of the lead screw 116 and the second gear 108B. The bearing portions 210 can then be formed of the same or different material(s) as that of the lead screw 116 and the second gear 108B.

The second cover member 164 includes apertures 232, which can be aligned with apertures 236 in the first cover member 160. Fasteners 238 engage the first cover member 160 and the second cover member 164 together via the apertures 232 and 236. In the illustrated embodiment, the fasteners 238 can be threaded (and in some cases, self-tapping), and the apertures 236 may be provided with or without internal threads to engage the fasteners 238. In some embodiments, the fasteners 238 are not threaded, and are configured to engage the apertures 236 in another manner. When coupled together, the first and second cover members 160 and 164 combine to enclose the interior space 146 defined between the first and second plates 132 and 136.

Although both the first cover member 160 and the second cover member 164 are illustrated as being L-shaped, with each of the cover members forming approximately half of the cover assembly 128, other shapes and combinations that substantially enclose the interior space 146 will be evident. For example, either the first cover member 160 or the second cover member 164 can be U-shaped, and the other of the first cover member 160 and the second cover member 164 may be substantially planar. Similarly, the manner of connecting the first cover member 160 and the second cover member 164 is not limited to the type and the arrangement of the fasteners 238, which are shown in the drawings.

To assemble the gearbox housing 104, the first plate 132 and the second plate 136 are oriented parallel to each other (i.e., the planes defined by the plates are parallel) and spaced a distance apart. The connectors 140 couple the first plate 132 and the second plate 136 via the respective peripheral apertures 152 and 158. In some embodiments, the connectors 140 are two-piece rivets. As shown in FIG. 2, each connector 140 can include an elongated post portion 140A and a head portion 140B that is securable to the post portion 140A. Alternately, one-piece rivets may be used. The one-piece rivets may be provided with a head at one end for engaging one of the first and second plates 132 and 136 and a shoulder adjacent a second end for engaging the other of the first and second plates 132 and 136. The second end of the one-piece rivet can be pressed after assembly with the first and second plates 132 and 136 to deform the second end and secure the first and second plates 132 and 136 together. In some embodiments, the connectors 140 are configured to inhibit the first plate 132 and second plate 136 from separating (e.g., pulling apart from each other along an axis perpendicular to the first face 132A and the first face 136A). In some embodiments, the connectors 140 may also be configured to inhibit the first plate 132 and the second plate 136 from being pushed closer together (e.g., closing into the interior space 146 and reducing the distance between the plates 132 and 136).

Furthermore, the mounting member 144 may be coupled to the second plate 136. In one embodiment, the mounting member 144 includes apertures 144D between the mounting portions 144A. The apertures 144D may be aligned with corresponding apertures 240 in the second plate 136. A securing member, such as a rivet 242 can be pressed into the apertures 144D and 240 to secure the mounting member 144 and the second plate 136 together. The rivet 242 can be a two-piece rivet as shown in FIGS. 2 and 3, or alternatively, the rivet 242 can be a one-piece rivet as described above with reference to the connectors 140. In another embodiment, the mounting member 144 is integrally-formed with posts (not shown) in place of the apertures 144D, which can be aligned with the apertures 240 in the second plate 136 and secured thereto, either by passing the posts through the apertures 240 and deforming the ends of the posts or by passing the posts through the apertures 240 and coupling an additional securing member thereto. In further embodiments, the mounting member 144 can be removably mounted to the second plate 136 and not secured thereto.

The frame structure 124 is completely assembled when the first plate 132 and the second plate 136 are secured together with the connectors 140 and when the mounting member 144 is secured to the second plate 136. The frame structure 124 provides the strength for the gearbox housing assembly 104 as discussed in greater detail below.

Within the frame structure 124, the second gear 108B is positioned securely between the first plate 132 and the second plate 136. A first end 116A of the lead screw 116A abuts the mounting member 144. On the opposite side of the second gear 108B, the shoulder 210A abuts a washer 244 adjacent the aperture 148. In some embodiments, the washer 244 is a spring washer (e.g., Belleville washer, wave spring, etc.), which axially biases the second gear 108B and the lead screw 116, providing a predetermined amount of preload. In some embodiments, the washer 244 is a flat washer, and a biasing member is used in conjunction with the washer 244 to provide a predetermined amount of preload. The preload can be particularly tuned to particular applications to provide reduced noise, vibration, etc. and to accept potential tolerance stack-up among the assembled parts of the gearbox assembly 100.

The cover assembly 128 is coupled together around the frame structure 124 to enclose the interior space 146 and shelter the gear set 108 from the external environment. Assembling the cover assembly 128 includes positioning the grooves 192 and 220 in the first and second cover members 160 and 164 to receive the peripheral side edges 132C and 136C of the first and second plates 132 and 136. In other embodiments, the grooves 192 and/or 220 can be eliminated. The protruded portions 132D and 136D of the first and second plates 132 and 136 are inserted through the slots 192A, such that the apertures 193 in the first cover member 160 are aligned with the respective apertures 132E and 136E in the first and second protruded portions 132D and 136D. The fasteners 195 secure the first cover member 160 to the frame structure 124.

Furthermore, assembly of the cover assembly 128 includes securing the first and second cover members 160 and 164 together. In the illustrated embodiment, as described briefly above, the second cover member 164 is secured to the first cover member 160 with fasteners 238. In the illustrated embodiment, three fasteners 238 couple the first and second cover members 160 and 164 together. In other embodiments, more or less than three fasteners 238 can be employed and/or different components or substances may be provided for securing the first and second cover members 160 and 164 together. Both the first cover member 160 and the second cover member 164 can be removed and/or replaced without disassembling or otherwise affecting the frame structure 124. In addition, removal of the cover assembly 128 from the frame structure 124 has very little impact on the strength of the frame structure 124.

The cover assembly 128 is separate and removable from the frame structure 124, such that the frame structure 124 can be highly modular and variously configurable without necessitating any change to the first or second cover members 160 and 164. As such, one or more of the first plate 132, the second plate 136, the connectors 140, and the mounting member 144 can be altered or replaced (such as replacement with a different material having a different strength and/or replacement with components having varied configuration, connecting structure, hole patterns, etc.), and the original (or identical) cover members 160 and 164 may still be used to construct the gearbox housing assembly 104.

Further alterations made possible by the modular construction of the frame structure 124 and the cover assembly 128 include modification to or integration of the mounting member 144 and/or modifications to the connectors 140. For example, the mounting portions 144A may be provided with different length, width, spacing, and/or differently sized or configured mounting apertures 144B. Such variations to the mounting member 144 may be useful in response to various different mounting arrangements for the gearbox assembly 100, which, in some circumstances, may be driven by specific circumstances of the utilized application.

Figure 5:
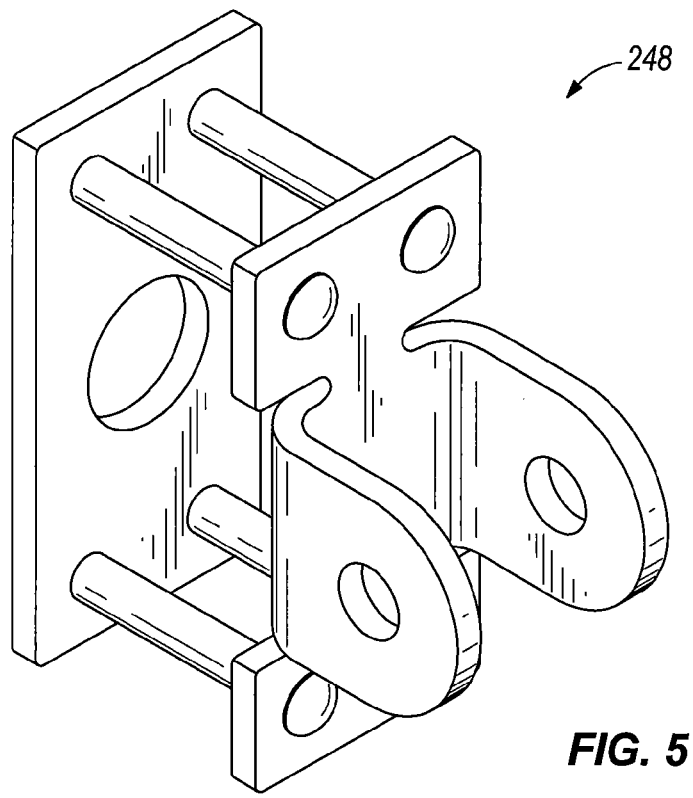
FIG. 5 is a perspective view of a plate with an integrally-formed mounting member.
Figure 6:
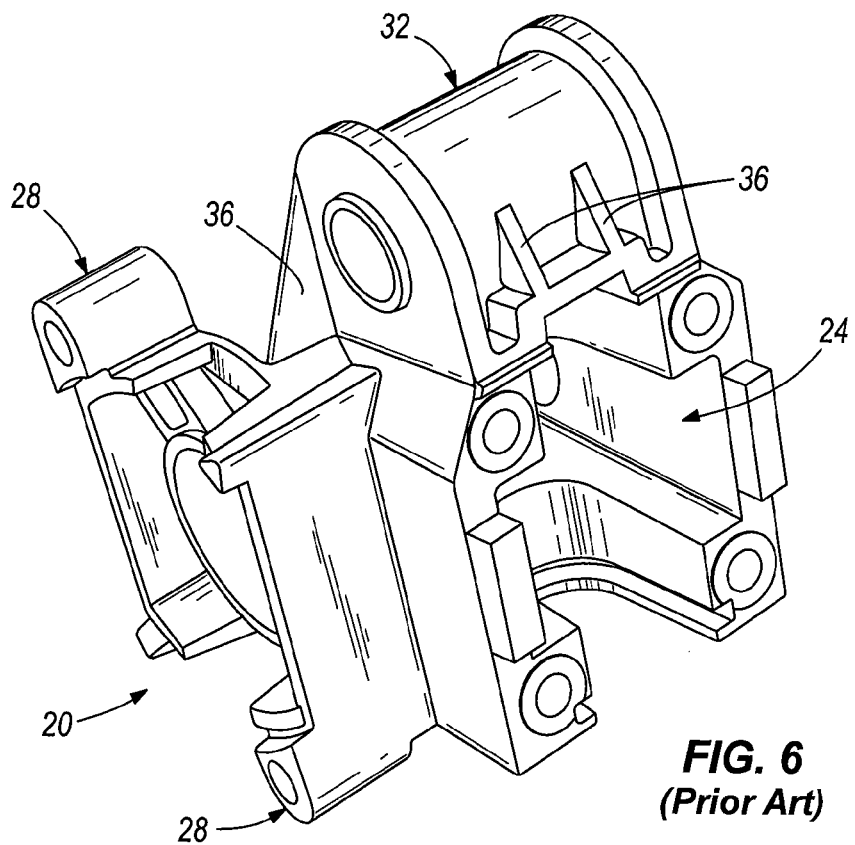
FIG. 6 is a perspective view of a prior art gearbox housing.

As shown in FIG. 5, a mounting plate 248 may incorporate the features of the second plate 136 and the mounting member 144 of FIGS. 1-3. In some embodiments, the mounting plate 248 can be a one-piece direct replacement for the separate second plate 136 and mounting member 144, and may be used instead of the separate second plate 136 and mounting member 144 dependent upon manufacturability, material, required strength, cost, etc. The connectors 140 may be greater or fewer in number and/or arranged differently with respect to the first and second plates 132 and 136 from what is shown in FIGS. 1 and 2. The mounting plate 248 is interchangeable with other generally-similar mounting plates (not shown), which can have alternate configurations for mounting sizes, styles, etc. In contrast, the mounting member 144 of FIGS. 1-4B is distinct from both the first plate 132 and the second plate 136 to facilitate interchangeability. Specifically, the mounting member 144 can be selected from a group of generally-similar mounting members (not shown) that each fit together with the second plate 136 and each provide slightly varied strength, mounting configuration, etc.

Due to the modular construction of the frame structure 124, any one component of the frame structure 124 can be replaced as desired by a similarly-shaped component of a different material having a different strength and/or replaced by a similarly-shaped component having a different configuration with different connecting structure, hole patterns, etc. Furthermore, separate components such as the mounting member 144 and the second plate 136 (when separately provided) can be constructed of different materials. The mounting member 144 can be constructed of a first material having a first strength, providing a first structural rigidity, and the second plate 136 can be constructed of a second material having a second strength, providing a second structural rigidity, different from the first structural rigidity.

Two identically-appearing frame structures 124 can provide two identically-appearing gearbox housing assemblies 104 having different structural rigidities. The first of the two frame structures 124 can include plates 132 and 136 constructed of a first plate material, connectors 140 constructed of a first connector material, and a mounting member 144 constructed of a first mounting member material. In some embodiments, the first plate material, the first connector material, and the first mounting member material are the same material, but alternately, one or more of the first materials may be different from each other. The second of the two frame structures 124 can include plates 132 and 136 constructed of a second plate material, connectors 140 constructed of a second connector material, and a mounting member 144 constructed of a second mounting member material. In some embodiments, the second plate material, the second connector material, and the second mounting member material are the same material, but alternately, one or more of the second materials may be different from each other. Cover members 160 and 164 can be assembled together with the first frame structure 124 to complete a first gearbox housing assembly 104. Cover members 160 and 164, substantially identical to the respective cover members 160 and 164 of the first gearbox housing assembly 104, can be assembled together with the second frame structure 124 to complete a second gearbox housing assembly 104. The second of the two frame structures 124 can provide a stronger, more structurally-rigid gearbox housing assembly 104 than the first frame structure 124.

Similarly, materials can be varied throughout the different components of the frame structure 124 to provide the requisite strength exactly where needed for the particular utilization of the gearbox housing assembly 104. Lower strength (in many cases, less expensive) materials can be used where the particular demands and requirements of the application are lower. The same principle is applied to the cover assembly 128, which generally does not serve as a principal structural portion of the gearbox housing assembly 104 and need not be constructed of a high strength material. Therefore, the cover members 160 and 164 can be constructed of one or more materials that are lighter and/or less rigid and/or less expensive than one or more materials of the first and second plates 132 and 136, the mounting member 144, and the connectors 140. For example, in one embodiment, the first and second plates 132 and 136, the mounting member 144, and the connectors 140 are constructed of metal (e.g., steel, aluminum, etc.) and the cover members 160 and 164 are constructed of plastic.

Positioning the cover members 160 and 164 substantially around the peripheral side edges 132C and 136C rather than simply sandwiching them between the inner faces 132B and 136B of the first and second plates 132 and 136 prevents any substantial crush loading of the cover members 160 and 164 when a load is applied to the gearbox housing assembly 104 along an axis perpendicular to the planes of the first and second plates 132 and 136. Rather, an axial load (along the lead screw 116) can be directly transferred from the lead screw 116 and/or second gear 108B to the mounting member 144.

A compressive load exerted on the lead screw 116 can be directly transferred to the mounting member 144 via the contact between the first end 116A of the lead screw 116 and the body portion 144C of the mounting member 144. Therefore, the load is substantially bypassed from being transferred through the gear set 108 and/or through the cover assembly 128, and additionally, a separate thrust plate or bearing is not necessary. The mounting member 144 can be coupled to a load-bearing support as determined and provided by the mounting arrangement of the particular utilized application to meet the loading requirements of that application. A tensile load exerted on the lead screw 116 can be transferred to the mounting member 144 via the first plate 132, the connectors 140, and the second plate 136. The pulling force is applied by the second gear 108B to the inner face 132B of the first plate 132 (via the washer 244), compressing any preload/biasing member positioned therebetween. The first plate 132 transfers the force directly to the second plate 136 through the connectors 140. The second plate 136 directly transfers the incident force to the mounting member 144 (and to the external load-bearing support of the mounting arrangement). Therefore, the load is substantially bypassed from being transferred through the gear set 108 and/or through the cover assembly 128. In some embodiments, the grooves 192 and 220 in the cover members 160 and 164 are provided with a slight clearance on the thickness of the first and second plates 132 and 136 to prevent any substantial loading of the cover members 160 and 164 in either tension or compression.

Any force or force component along the direction of the lead screw 116 and the mounting portions 144A (i.e., perpendicular to the planes defined by the first and second plates 132 and 136) is carried principally by the frame structure 124 and not by the cover assembly 128, unless directly exerted upon the cover assembly 128 from an external source.

In one application, the gearbox assembly 100 is particularly suited to a reclining mechanism, for example in an electrically-powered automotive seat. The mounting portions 144A of the mounting member 144 can be secured to a torsional bar within the seat frame, and the drive nut 120 can be coupled to a pivotable member within the upright back portion of the seat. During a vehicle crash event, large loads may be exerted on the upright back portion of the seat by the seat's occupant. Such loads are transferred through the lead screw 116 and to the mounting member 144. The torsional bar within the seat frame is specifically configured to withstand the large loads typical of a crash. As described above, it is the function of the frame structure 124, independent of the cover assembly 128, to transmit the force of the crash to the seat frame.

Various vehicle manufacturer specifications for sustainable load on the gearbox assembly 100, and particularly the gearbox housing assembly 104, can be met by varying only selected components of the gearbox housing assembly 104. For example, two different manufacturer specifications can be met with two separate gearbox housing assemblies 104 that contain respective plates 132 and 136, connectors 140, and mounting members 144 particularly designed and assembled to have different load-bearing characteristics (which may include varying the material, dimensions, orientation of features, interface between parts, etc. of one or more of the mentioned components). Two identical cover assemblies 128 (and in some cases, certain identical components of the frame structure 124) may be used on the two different gearbox housing assemblies 104.

The seat reclining mechanism is only one example of an applied utilization for the invention that takes advantage of the features thereof. Other applications within the automotive field include, but are not limited to, seat height adjusters, seat forward/rearward adjusters, windshield wiper devices, and window lift mechanisms. However, the features of the invention may be utilized in numerous gearbox applications in other fields.

Thus, the invention provides, among other things, a modular gearbox assembly 100 including a modular gearbox housing assembly 104, as well as methods of constructing the same. Various features and advantages of the invention are set forth in the following claims.

What is claimed is:
1. A gearbox housing assembly comprising:
a first plate constructed of a rigid material and defining a first plane;
a second plate defining a second plane parallel to and spaced from the first plane, the second plate being constructed of a rigid material;
a plurality of connectors coupling the first plate and the second plate, an interior space being defined between the first plate and the second plate, within a periphery of the first plate and a periphery of the second plate;
a mounting member coupled to the second plate and having at least one mounting portion extending outside the inte- rior space, the mounting member being distinct from the second plate to facilitate interchangeability of the mounting member; and at least one cover member substantially enclosing the interior space, the at least one cover member being constructed of a material substantially lighter than a material of the first and second plates, the at least one cover member being coupled to the first and second plates around the peripheries of the first and second plates such that a force applied to the first plate in a direction substantially normal to the first plane is transmitted through the first and second plates and the plurality of connectors to the mounting member without being applied to the at least one cover member.

2. The gearbox housing assembly of claim 1, wherein the at least one cover member defines a pair of cover members that cooperate to substantially enclose the interior space.

3. The gearbox housing assembly of claim 1, wherein the at least one cover member includes an attachment portion for mating with an input drive source.

4. The gearbox housing assembly of claim 3, wherein the input drive source defines an axis of rotation that is parallel to the first and second planes defined by the first and second plates.

5. The gearbox housing assembly of claim 1, wherein the first plate includes an aperture configured to receive an output member therethrough.

6. The gearbox housing assembly of claim 5, wherein the mounting member includes a body portion positioned within the interior space and configured to transmit a compressive force present on the output member directly from the output member to the mounting portion of the mounting member without applying a substantial portion of the compressive force to the at least one cover member.

7. The gearbox housing assembly of claim 1, wherein the mounting member is U-shaped and includes the at least one mounting portion defining a pair of mounting portions.

8. A modular gearbox assembly comprising:

a first plate defining a first plane;

a second plate defining a second plane parallel to and spaced from the first plane, the first plate and the second plate being rigidly coupled together, thereby defining an assembled frame structure;

a cross-axis gear set positioned at least partially in an interior space defined between the first plate and the second plate and within a periphery of the first plate and a periphery of the second plate;

a mounting member coupled to one of the first plate and the second plate, the mounting member having at least one mounting flange extending outside the interior space; and at least one cover member being non-destructibly removable from the assembled frame structure without disassembling the frame structure.

9. The modular gearbox assembly of claim 8, wherein the first plate, the second plate, and the mounting member are configured to provide structural rigidity of the modular gearbox assembly substantially independently of the strength of the at least one cover member.

10. The modular gearbox assembly of claim 8, wherein the first and second plates are constructed of a first material and the at least one cover member is constructed of a second material different than the first material, the second material being substantially lighter and less structurally rigid than the first material.

11. The modular gearbox assembly of claim 10, wherein the first material is metallic, and the second material is plastic.

12. The modular gearbox assembly of claim 8, wherein a first gear of the cross-axis gear set is coupled to an input drive source defining an axis parallel to the first and second planes, and a second gear of the cross-axis gear set is coupled to a rotatable output member, which extends through the first plate.

13. The modular gearbox assembly of claim 12, wherein a compressive force on the output member is transmitted directly to the mounting member without transferring a substantial portion of the compressive force to the at least one cover member.

14. The modular gearbox assembly of claim 8, wherein the at least one cover member is coupled to the first and second plates such that a force applied to either of the first plate and the second plate in a direction substantially normal to the first and second planes is transmitted through the first and second plates to the mounting member without being applied to the at least one cover member.

15. The modular gearbox assembly of claim 8, wherein the mounting member is distinct from both the first and the second plate, the mounting member being coupled to one of the first plate and the second plate to facilitate interchangeability of the mounting member.

16. The modular gearbox assembly of claim 8, wherein the at least one cover member lies outside and against at least one peripheral edge of the first plate and lies outside and against at least one peripheral edge of the second plate.

* * * * *